United States Patent
Fujihira et al.

(10) Patent No.: US 6,215,121 B1
(45) Date of Patent: Apr. 10, 2001

(54) THREE-DIMENSIONAL SCANNING PROBE MICROSCOPE

(75) Inventors: Masamichi Fujihira, Kawasaki; Masatoshi Yasutake, Chiba; Tatsuya Miyatani, Chiba; Toshihiko Sakuhara, Chiba; Kazutoshi Watanabe, Chiba, all of (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/124,128

(22) Filed: Jul. 29, 1998

(30) Foreign Application Priority Data

Jul. 29, 1997 (JP) .................................................. 9-203484

(51) Int. Cl.⁷ .................................................. G01N 13/16
(52) U.S. Cl. ........................................... 250/306; 250/307
(58) Field of Search ................................... 250/306, 307, 250/423 F

(56) References Cited

U.S. PATENT DOCUMENTS

| | | | |
|---|---|---|---|
| 5,432,346 | * 7/1995 | Nose et al. ............................ | 250/306 |
| 5,519,212 | * 5/1996 | Elings et al. .......................... | 250/306 |
| 5,742,172 | * 4/1998 | Yasutake ............................... | 324/754 |
| 5,744,799 | * 4/1998 | Ohara .................................. | 250/307 |
| 5,907,096 | * 5/1999 | Chen ................................... | 73/105 |
| 5,918,274 | * 6/1999 | Chen et al. ........................... | 73/105 |

\* cited by examiner

Primary Examiner—Bruce C. Anderson
(74) Attorney, Agent, or Firm—Adams & Wilks

(57) ABSTRACT

A signal having a resonant frequency of a cantilever is output by a first oscillator, and supplied to a vibrating element and a control unit to oscillate a probe. A low frequency signal having a large amplitude is output by a second oscillator and supplied to a piezoelectric scanning apparatus. The probe is periodically and relatively moved with respect to the sample between a position where the sample surface is penetrated by the probe and another position where the probe does not penetrate the sample surface and is outside the range of atomic forces caused by the sample. During this movement, the probe movement may be analyzed to obtain a plurality of physical characteristics about the sample, e.g., hardness information of the sample, surface shape information, information related to an adsorption layer of the sample, and information related to physical qualities (for example, electromagnetic field, adsorption force, surface reaction force, electric double layer force in fluid) irradiated from the sample surface along a depth direction.

17 Claims, 6 Drawing Sheets

FIG. 4

| TIME INSTANT | MOVEMENT OF PROBE RELATIVE TO SAMPLE | ACQUIRED PHYSICAL INFORMATION |
|---|---|---|
| ①→② | APPROACHES TO SAMPLE SURFACE | DISTRIBUTION INFORMATION OF ELECTROMAGNETIC FIELD, ADSORPTION FORCE, SURFACE REACTED FORCE IN THE Z-DIRECTION FROM SAMPLE SURFACE |
| ②→③ | DEPRESSES INTO SAMPLE | HARDNESS INFORMATION OF SAMPLE |
| ③ | REACHES AT DEEPMOST POINT OF THE DEPRESSION | SHAPE INFORMATION OF SAMPLE SURFACE |
| ④→⑤ | GOES AWAY FROM SAMPLE SURFACE | VISCOUS INFORMATION OF ADSORPTION LAYER OF SAMPLE |
| ⑥ | SEPARATES FROM SAMPLE SURFACE | ADSORPTION FORCE INFORMATION OF ADSORPTION LAYER OF SAMPLE |

THREE-DIMENSIONAL SCANNING PROBE MICROSCOPE

BACKGROUND OF THE INVENTION

The present invention relates to a three-dimensional scanning probe microscope, and more specifically, is directed to such a three-dimensional scanning probe microscope capable of acquiring a plurality of types of physical information of a sample during a single scanning operation or single pass.

As a method for observing a shape of a sample surface and a physical amount characteristic of the sample surface using a conventional scanning probe microscope, an observation method is mainly subdivided into a method for observing a sample while a probe is brought in contact with the sample, and another method for observing a sample while a probe is not brought in contact with the sample.

When a sample is observed by way of the former method, for instance, concave/convex images of a surface of the sample and friction images thereof can be separately observed. On the other hand, when a sample is observed by way of the latter method, physical information emitted from a surface of the sample, for example, a magnetic distribution image and an electrostatic distribution image of the sample can be observed.

In the above-described observation methods, the sample surface is scanned in a two-dimensional manner by the probe so as to be observed, while the probe is brought in contact with the sample surface, or is separated from the sample surface by a predetermined distance. As a result, data which is acquired during a single observation operation merely corresponds to a single physical amount contained in a sample. These observation methods are not especially designed to be capable of acquiring a plurality of physical amounts during a single observation operation. Also, in the conventional observation methods, for instance, in such a case that a magnetic distribution image of a sample is observed, although the two-dimensional magnetic distribution image of the sample where the probe is at a position separated from this sample by a preselected distance can be observed, there is a problem. That is, a three-dimensional magnetic distribution image of the sample cannot be observed. This three-dimensional magnetic distribution image is produced by adding a magnetic distribution of a height direction of the sample to this two-dimensional magnetic distribution image.

The present invention has been made in view of the shortcoming of the above-described conventional techniques, and provides a three-dimensional scanning probe microscope capable of observing a plurality of physical amounts of a sample while an observation is carried out in one pass. Another object of the present invention is to provide a three-dimensional scanning probe microscope capable of acquiring a physical characteristic of a sample in a three-dimensional manner.

SUMMARY OF THE INVENTION

To achieve the above-explained objects, a three-dimensional scanning prove microscope, according to a first feature of the present invention, is featured by being a three-dimensional scanning probe microscope equipped with a probe capable of performing relative scanning operations along an x direction and a y direction in parallel to a surface of a sample, and also a moving operation along a z direction perpendicular to the sample surface with respect to the sample surface, wherein the probe is moved along the z direction at a second frequency in such an amplitude at least defined from a first position where the sample surface is depressed by the probe up to a second position where the probe is not influenced by atomic force with respect to the sample surface so that a plurality of data characteristics can be acquired during the movement of the probe. Also, a second feature of the present invention is featured by that the probe is vibrated at a first frequency (first frequency>second frequency) which is resonated, or forcibly vibrated with the probe.

In accordance with the present invention, since the probe can be periodically and relatively moved from a position where the probe is separated from the sample up to another position where the probe is depressed into this sample with respect to the sample, plural sorts of physical information of the sample can be acquired while the probe is moved within 1 time period. Also, since the information acquired within this 1 time period can be used as the information about one pixel, this scanning operation by the probe is extended over the entire check region of the sample. As a consequence, the plural sorts of physical information of this sample can be acquired during one scanning operation (one pass). Also, since the resultant plural sorts of physical information are acquired from the same point of the sample, these plural sorts of physical information own relative relations with each other, which may contain valuable information.

BRIEF DESCRIPTION OF THE DRAWINGS

FIG. 4 is a diagram for representing a relationship between the probe and the sample, and a relationship between the probe and data acquired from this probe.

DETAILED DESCRIPTION OF THE INVENTION

Figure 1:
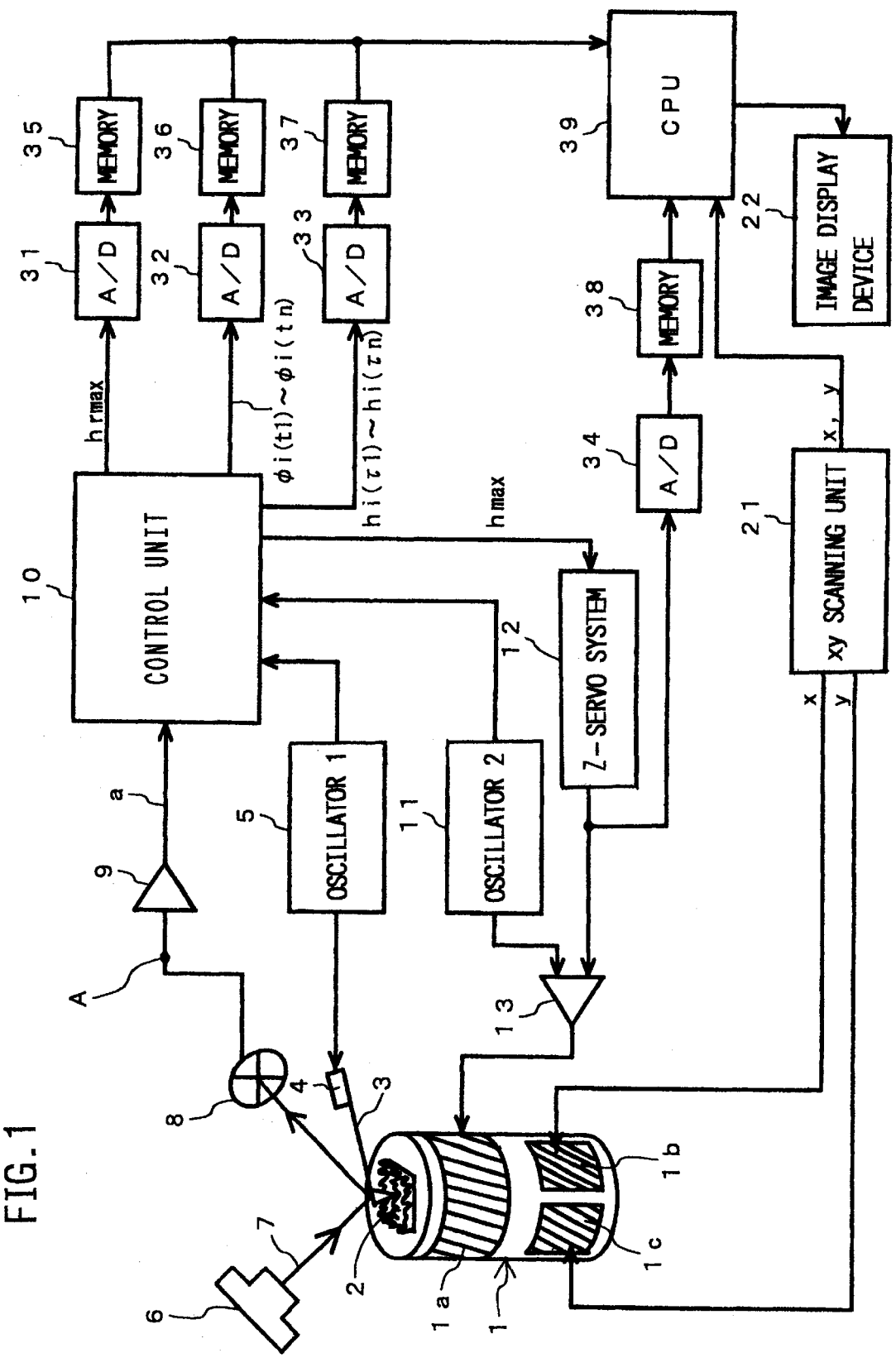
FIG. 1 is a schematic block diagram for indicating an arrangement of an embodiment of the present invention.

Referring now to the attached drawings, the present invention will be described in detail. FIG. 1 is a schematic block diagram for indicating an arrangement of an embodiment of the present invention.

Figure 2A:
FIGS. 2A–2D are waveforms charts of signals of major portions in FIG. 1.

In this drawing, reference numeral 1 shows a piezoelectric scanning apparatus in which an electrode 1a used for a z-fine moving operation, 4-split electrodes 1b, 1c, 1d, 1e (1d and 1e are not shown) for an x-scanning operation and a y-scanning operation are provided on a cylindrical surface of a cylindrical piezoelectric element. A sample 2 to be monitored is mounted on an upper surface of this piezoelectric scanning apparatus 1. Above this sample 2, a cantilever 3 having a probe located opposite to the sample 2 is provided. A vibrating element 4 is fixed on one end of the cantilever 3, and this vibrating element 4 causes the cantilever 3 to be resonated upon receipt of a signal having a first frequency outputted from a first oscillator 5. As shown in FIG. 2A, a signal having an amplitude A1 (1 nm≦A1≦500 nm) and a frequency f1 equal to a resonant frequency of the cantilever 3 is outputted from this first oscillator 5. It should be understood that as this frequency f1, such a frequency may be employed by which the cantilever 3 is forcibly vibrated.

A distortion amount of the above-described cantilever 3 is detected by measuring an incident position of laser light 7 outputted from a laser generator 6 by a position detector 8. The position detector 8 is constructed by, for instance, a four-segment optical detecting electrodes. This position detector 8 is positioned in such a manner that when the distortion amount of the cantilever 3 becomes 0, the spot of the laser light 7 is located at a center of these four-segment electrodes. As a result, when distortion occurs in the cantilever 3, the spot of the laser light 7 is moved on the four-segment electrodes, and a difference is produced in voltages outputted by the four-segment electrodes. This voltage difference is amplified by an amplifier 9 to become a signal "a". The signal "a" is inputted to a control unit 10.

Figure 2B:
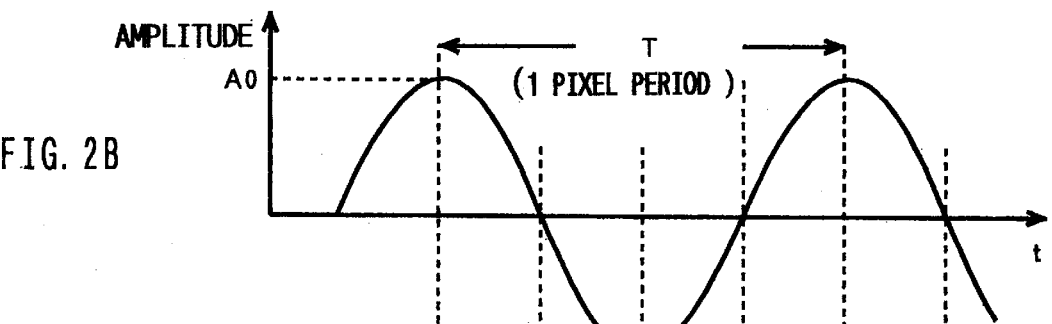

As shown in FIG. 2B, the second oscillator 11 outputs such a signal having an amplitude A0 (10 nm≦A0≦3,000 nm) and a frequency f2 (f2<f1). The signal outputted from this second oscillator 11 is added by an adder 13 to a feedback signal outputted from a z-servo system 12. The added signal is applied to the z-fine-moving electrode 1a of the piezoelectric scanning apparatus 1.

An x, y scanning unit 21 produces an x scanning signal and a y scanning signal. The x scanning signal is applied to the electrodes 1b and 1d for the x scanning operation, whereas the y scanning signal is applied to the electrodes 1c and 1e for the y scanning operation. Also, these x and y scanning signals are sent to a computer 39. Reference numerals 31 to 34 show A/D converters for converting the input data into digital signals. Reference numerals 35 to 38 indicate memories for storing thereinto the digital data outputted from these A/D converters 31 to 34, and are, for example, frame memories. A calculating/image displaying computer 39 selectively reads the digital data stored in the memories 35 to 38, and calculates these digital data to be converted into image display data. Then, the calculating/image displaying computer 39 sends out the image display data to an image display device 22. The image display device 22 displays a physical characteristic of the sample 2.

Figure 3A:
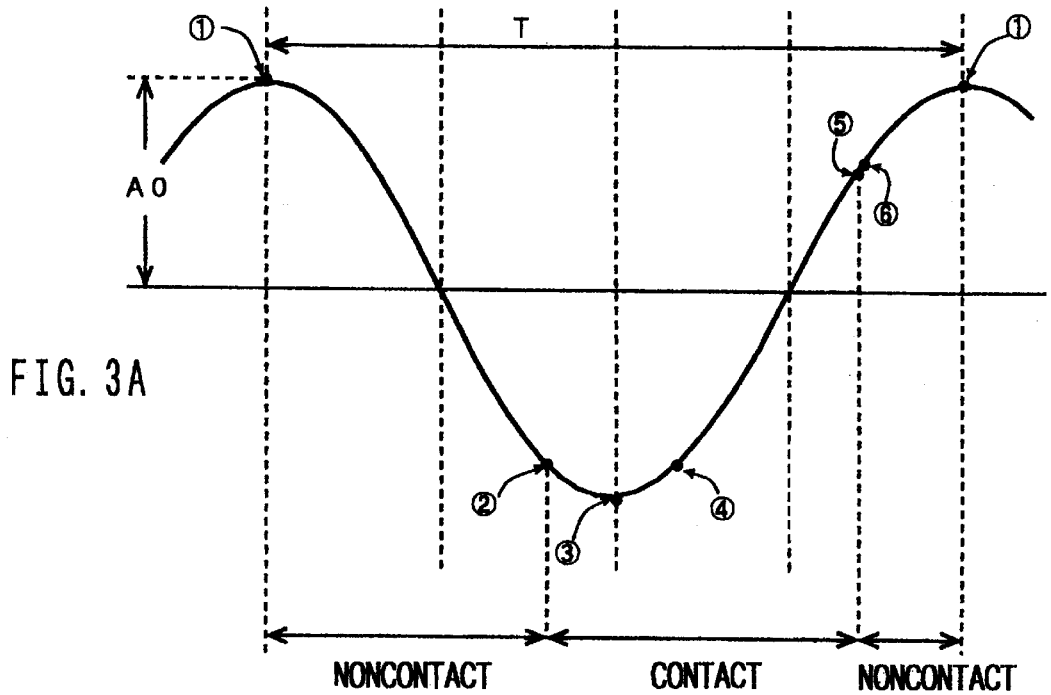
FIG. 3A is a waveform chart of a signal outputted from a second oscillator of FIG. 1.
Figure 3B:
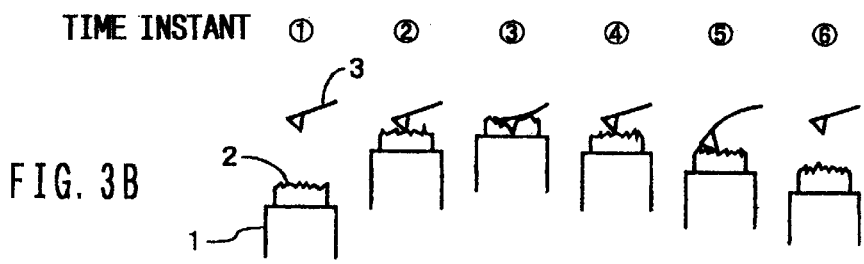
FIG. 3B is a diagram for representing a relationship between a sample and a probe operated in response to this signal.

Next, the operations of the three-dimensional scanning probe microscope shown in FIG. 1 will now be summarized with reference to FIGS. 3A and 3B, while paying an attention to a distance between the sample 2 and the above-described probe. In FIGS. 3A and 3B, the same reference numerals shown in FIG. 1 indicate the same, or similar elements. FIG. 3A shows 1 time period "T" of a signal outputted from the second oscillator 11. This signal may be expressed by, for instance, A0 cos 2 π ft (not the symbol "f" is a frequency, and symbol "t" denotes time) equal to a cosine function. Alternatively, this signal may be expressed by a signal having another waveform.

At a time instant ① when the amplitude of this signal is maximum, as represented by ① in FIG. 3B, the sample 2 is located at the lowermost position, and the distance between the probe and the sample 2 becomes maximum. As previously explained, since the amplitude A0 is sufficiently large, at this time, the probe is located at a reference position sufficiently separated from the sample surface. At a time instant ② of this signal, the sample 2 is lifted up to such a position as represented as ② of FIG. 3B, and thus the probe is made in contact with the surface of the sample 2. At a time instant ③ of the signal, the sample 2 is located at the uppermost position where the probe is depressed into the deepmost position in this sample 2. At this time, the cantilever 3 is bent to one side.

At a time instant ④ of this signal, the sample 2 descends up to the substantially same height as that of the above-described time instant ②. At this time, the depression force by the probe against the sample 2 becomes substantially zero. At time instants ④ to ⑤ of the signal, since the sample 2 further descends, the probe is tried to be separated from the sample 2. However, due to the adsorption force of the sample 2, the probe is set under such a condition that this probe cannot be separated from the sample 2. The cantilever 3 is bent to the other side. Then, at a time instant ⑤, the probe is separated from the sample 2 by releasing the adsorption force of the sample 2. At a time instant ⑥, the probe is returned to the original reference position. At the time instant ① of the end of the above-described 1 time period T, the sample 2 is returned to the original position (height).

As indicated in FIG. 3A, a time period defined between the time instant ① and the time instant ② may be referred to as a "non-contact time period"; another time period defined between the time instant ② and the time instant ⑤ may be referred to as a "contact time period", and another time period defined between the time instant ⑥ and the time instant ① may be referred to as a "non-contact time period".

When the above-described operation for 1 time period T is accomplished, the probe can acquire the data for 1 pixel among the detected image information of the sample 2 displayed on the image display device 22.

Figure 2C:
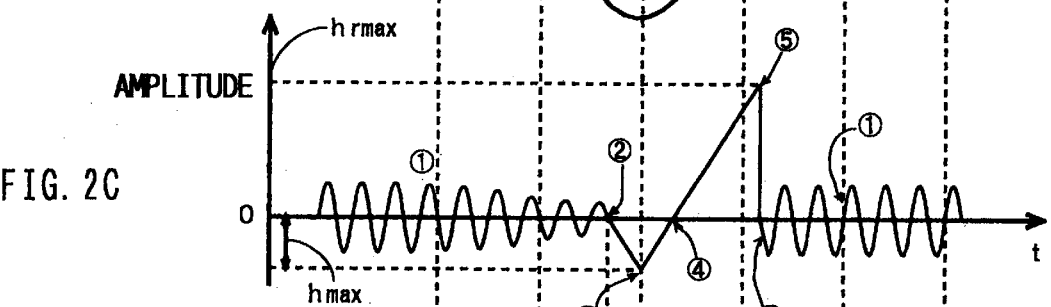
Figure 2D:
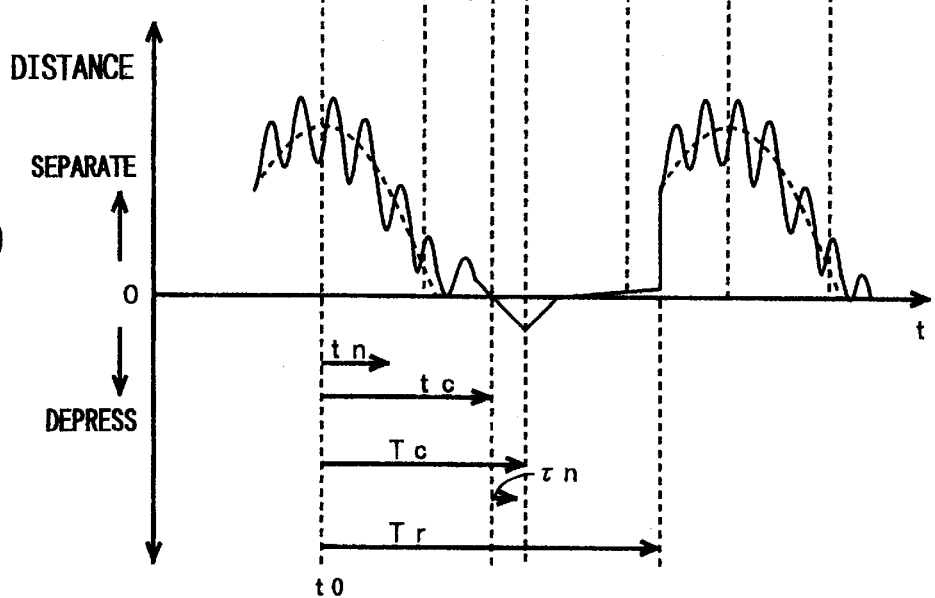

A waveform of FIG. 2C indicates a waveform of an output signal (waveform at point A) from the position detector 8 of FIG. 1. Numerals surrounded by circles shown in FIG. 2C correspond to numerals surrounded by circles indicated in FIGS. 3A and 3B. FIG. 2D denotes a relative position of the cantilever 3 in such a case that the sample 2 is fixed at a position of a point "0".

As shown in FIG. 2C and FIG. 2D, during a time period defined between a time instant ① and a time instant ②, in response to the signal derived from the first oscillator 5, while the probe is vibrated at the resonant frequency of the cantilever 3, this probe approaches to the surface of the sample 2. At this time, when a certain physical amount (for example, magnetic field, electric field, adsorption force, surface reacted force, electric double layer force in fluid, etc.) is produced from the surface of the sample 2, this probe is influenced by this physical amount, so that a phase shift occurs in the phases of the resonant frequency. When this phase shift is detected, the physical amount derived from the surface of the sample 2 can be detected as a function of a distance measured from the sample surface.

Next, in another time period defined between a time instant ② and a time instant ③, since the probe is depressed into the sample 2, hardness information of the sample 2 can be acquired by calculating an inclination of a waveform shown in FIG. 2C during the time period defined between the time instants ② and ③. Next, the feedback control by the z-servo system 12 shown in FIG. 1 is performed in such a manner that the depression distance "hmax" of the probe 2 into the sample 2 at the time instant ③ becomes constant, so that the shape information of the surface of this sample 2 can be acquired from the information of this probe.

Furthermore, since a waveform during a time period defined between a time instant ④ and a time instant ⑤ is produced by such a fact that the sample 2 absorbs the probe, the viscous information related to the adsorption layer of this sample 2 can be acquired from the inclination of this waveform. Also, at a time instant ⑥, namely when the probe is separated from the surface of the sample 2 and thereafter is returned to the reference position thereof, the information related to the adsorption force of the above-described adsorption layer can be acquired. FIG. 4 illustrates that the above-explained physical information which can be acquired by the probe during 1 pixel period is indicated at the respective numerical points.

As previously described, according to the present invention, more than 5 types of these physical characteristics of this sample 2 can be acquired by merely scanning the probe only one time with respect to the sample 2. Also, since the above-described plural types of information are not separately acquired, but can be obtained from the same place at the same time, this acquired information may give rise to very important physical characteristic of the sample 2.

It should be noted that the time instants indicated in FIG. 2D except the time instant "τn" are indicated while the time instant "t0" at the maximum point of the output signal (FIG. 2B) derived from the second oscillator 11 is set as a reference (namely, t0=0); a time instant "tc" indicates time defined until the probe is made in contact with the sample 2; a time instant "Tc" indicates time defined until the probe is depressed into the sample 2 and then reaches the deepmost point; a time instant "Tr" indicates time defined until the probe is separated from the sample 2; and also a time instant "tn" shows time 0≦tn<tc. The time instant "τn" denotes time 0<τn<(Tc−tc). The above-explained various time will be used in the below-mentioned description.

Figure 5:
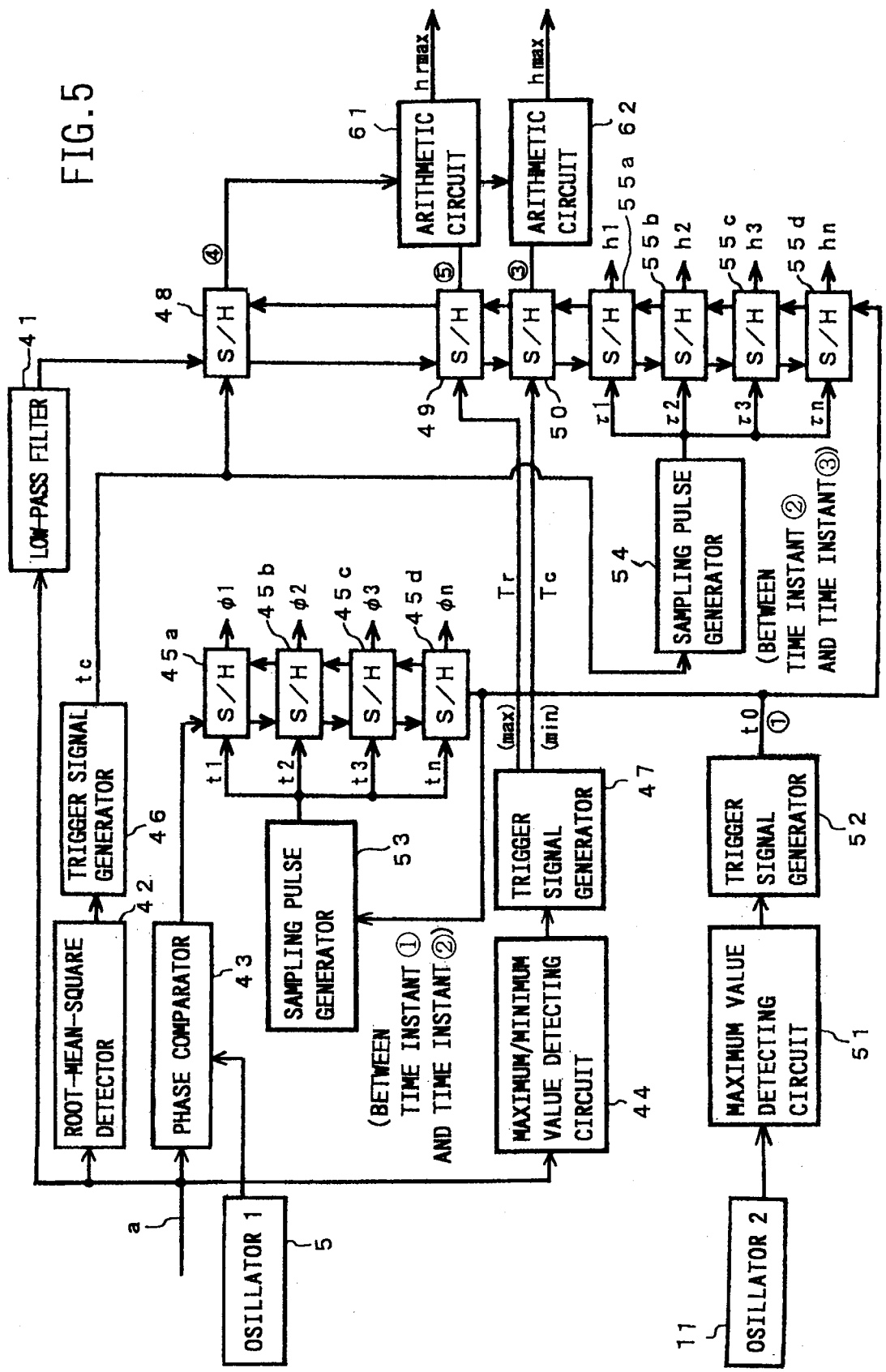
FIG. 5 is a block diagram for representing one example of functions of a control unit shown in FIG. 1.

Referring now to FIG. 1 and FIG. 5, an arrangement and operations of an apparatus, according to an embodiment, capable of acquiring the above-explained physical information will be described. FIG. 5 is a block diagram for indicating a function of a control unit 10 shown in FIG. 1.

When a signal "a" shown in FIG. 2C corresponding to the output signal of the position detector 8 is entered into the control unit 10, this signal "a" is inputted into a low-pass filter 41, a root-mean-square detector 42, a phase comparator 43, and a maximum/minimum value detecting circuit 44.

The low-pass filter 41 extracts a low frequency component of the signal "a" in order that a frequency component f1 of this signal is eliminated, and then supplies the filtered signal to a sample/hold circuit 48. When the root-mean-squared calculation value of the signal "a" becomes lower than, or equal to a threshold value, namely a very small amplitude, the root-mean-square detector 42 triggers a trigger signal generator 46. This trigger signal generator 46 outputs a time signal of the above-described time tc. The timing signal of this time tc is supplied to a second sampling pulse generator 54 so as to initiate this second sampling pulse generator 54. When the second sampling pulse generator 54 is initiated, the above-described time signals τ1 to τn are outputted.

The phase comparator 43 compares the phase of the signal "a" with the phase of the output signal (FIG. 2A) derived from the first oscillator 5, and then outputs a phase difference signal to the sample/hold circuit 45a to 45d. The maximum/minimum value detecting circuit 44 detects such timing when the signal "a" becomes maximum and minimum, and then outputs the detected timing to the trigger signal generator 47. The trigger signal generator 47 supplies, for instance, a clear rectangular trigger signal to the sample/hold circuit 49 at such timing Tr when the maximum value of the signal "a" is detected, and supplies a trigger signal to the sample/hold circuit 50 at such timing Tc when the minimum value is detected.

On the other hand, the signal (FIG. 2B) outputted from the second oscillator 11 is processed in a maximum value detecting circuit 51 in such a manner that timing at which this signal becomes maximum is detected. At this detection time instant t0, the trigger signal generator 52 outputs a trigger signal. This trigger signal triggers a first sampling pulse generator 53, and also resets the sample/hold circuits 45a to 45d, 55a to 55d, and 48 to 50.

The first sampling pulse generator 53 outputs time signals t1 to tn (tn<tc) having a preselected time interval in synchronism with this trigger signal. When these time signals t1 to tn are entered into the sample/hold circuits 45a to 45d, these sample/hold circuits 45a to 45d sample/hold the phase difference signal outputted from the phase comparator 43 at the respective timing thereof. The sample/hold circuits 45a to 45d output sampled/held phase difference signals φ1 to φn.

On the other hand, the second sampling pulse generator 54 outputs time signals τ1 to τn (0<τ1, τn<(Tc−tc)) having a preselected time interval in synchronism with this time signal tc. When these time signals τ1 to τn are entered into the sample/hold circuits 55a to 55d, these sample/hold circuits 55a to 55d sample/hold the low frequency signal outputted from the low-pass filter 41 at the respective timing thereof. The sample/hold circuits 55a to 55d output sampled/held values h1 to hn of the signal "a" during the time period defined between the time instant ② and the time instant ③.

A first arithmetic circuit 61 subtracts the value held by the sample/hold circuit 48 from the value held by the sample/hold circuit 49 to thereby produce the above-explained value hrmax. Also, a second arithmetic circuit 62 subtracts the value held by the sample/hold circuit 48 from the value held by the sample/hold circuit 50 to thereby produce the above-described value hmax. It should be noted that since a value obtained at a time instant ④ is substantially equal to a value obtained at a time instant ②, the value obtained at the time instant ② may be substituted by the value obtained at the time instant ④.

Next, the physical amount of the sample 2 acquired in accordance with this embodiment will now be explained in detail.

In accordance with this embodiment, the below-mentioned data (1) to (4) may be acquired every pixel (xi, yi) during the above-described 1 time period (1 pixel data acquisition time) T:

(1) hmaxxiyi: a signal of the cantilever 3 for a pixel (xi, yi) at a time instant Tc.

(2) hrmaxxiyi: a signal of the cantilever 3 for the pixel (xi, yi) at a time instant Tr.

(3) φxiyi (t1) to φxiyi (tn): a phase difference between an output signal of the cantilever 3 and an output signal of the first oscillator 5 for the pixel (xi, yi) at a time instant ti.

(4) hxiyi (tc+τ1) to hxiyi (tc+τn): a signal of the cantilever 3 for the pixel (xi, yi) at a time instant tc+τi.

The data hmaxxiyi of the above item (1) is supplied to the z-servo system 12 of FIG. 1. The z-servo system 12 supplies a feedback signal produced based on this data hmaxxiyi to the z-fine-moving electrode 1a of the piezoelectric scanning apparatus 1 so as to control that the distance between the probe and the sample 2 becomes constant. At this time, the control values of the z-servo system 12 are converted into digital values by the A/D converter 34 every pixel. These digital control values are stored in the memory 38. When the signals stored in the memory 38 are displayed on the image display device 22, the surface shape of the sample 2 can be displayed.

Next, the data hrmaxxiyi of the above-described item (2) are converted into digital values by the A/D converter 31, and these digital values are stored into the memory 35. When the digital signals stored in the memory 35 are displayed on the image display device 22, an adsorption distribution image of the adsorption layer of the sample 2 can be obtained.

Next, the data φxiyi (ti) to φxiyi (tn) of the above-described item (3) are converted into digital values by the A/D converter 32, and these digital data are stored into the memory 36. These data φxiyi (ti) to φxiyi (tn) are processed by the calculating/image displaying computer 39 in accordance with the following data converting process operation.

Assuming now that the resonant frequency of the cantilever 3 is "fr", the below-mentioned formula may be satisfied:

Formula 1

$$2\pi fr = \omega r = \sqrt{\sqrt{k/Meff}}$$

K: spring constant of cantilever

Meff: effective mass of cantilever.

At this time, when the cantilever 3 vibrated at the resonant frequency is positioned close to the surface of the sample 2, this resonant frequency is influenced by force F of the surface of the sample 2, so that this resonant frequency "ωr" is changed into ωr'. This resonant frequency ωr' may be expressed by the below-mentioned formula. It should be noted that as this force F, there are magnetic force, electrostatic force, and Van der Waals force.

Formula 2

$$\text{Sin } \omega r't = \text{Sin}(\omega rt - \phi i) = \text{Sin}\sqrt{(k - \partial F/\partial hi)/Meff} \cdot t \;\; \omega r't = \omega rt - \phi i = \sqrt{(k - \partial F/\partial hi)/Meff} \cdot t$$

φi: phase difference between signal of cantilever 3 and output signal of first oscillator 5 at height "hi" from sample surface;

hi: height from sample surface

∂F/∂hi: differential field at height "hi" from sample surface.

Accordingly, $$\omega r' = \sqrt{(k - \partial F/\partial hi)/Meff}$$

As a consequence, $$\frac{\partial F}{\partial hi} = k - \omega r'^2 Meff$$

In the above formula, "K" and "Meff" are constant values. As a consequence, a distribution of force F at the distance hi from the surface of the sample 2 with respect to the each of the pixels (xi, yi) can be obtained from the above formula. In other words, a distribution of the formula F along a depth direction from the surface of the sample 2, namely a distribution of the above-described magnetic force, electrostatic force, and Van der Waals force can be obtained.

It should be noted that the distance hi between the probe and the sample 2 at a time instant "ti" may be expressed by the below-mentioned formula:

$$hi = |A0\cos(2\pi tc/T) - A0\cos(2\pi ti/T)|$$

where symbol "tc" represents a time instant when the probe is made in contact with the sample surface, and is defined by ti<tc.

Subsequently, the data hxiyi (tc+τ1) to hxiyi (tc+τn) of the above-described item (4) are converted into digital values by the A/D converter 33, and then the digital values are stored into the memory 37. As to these data hxiyi (tc+τ1) to hxiyi (tc+τn), the calculating/image display computer 39 executes the below-mentioned data converting process operation.

Considering now a time range during which the probe is depressed into the sample 2, namely (tc+τ1) to (tc+τn). As a result, a depression distance hpi (tc+τi) of the probe at the time instant (tc+τi) is defined by the following formula:

$$hpi(tc+\tau n) = A0\cos(2\pi tc/T) = A0\cos\{2\pi(tc/\tau i)/T\}$$

As a consequence, force Fpi by the probe which depresses the surface of the sample 2 at the item instant (tc+τi) is given as follows, assuming now that the spring constant of the cantilever 3 is "K":

$$Fpi = K \cdot hpi(tc+\tau i).$$

This force Fpi can be balanced with the reaction force produced from the surface of the sample 2. As a result, assuming now that a localized spring force of the sample surface is "ks", the actual move amount of the probe is given as follows, since the signal from the cantilever 3 is equal to hxiyi (tc+τi):

$$Fpi = K \cdot hpi(tc+\tau i) = K \cdot hxiyi(tc+\tau i) + Ks(tc+\tau i) \cdot hxiyi(tc+\tau i)$$

Accordingly, $$ks(tc+\tau i) = K(hpi(tc+\tau i) - hxiyi(tc+\tau i))/hxiyi(tc+\tau i)$$

The localized spring constant "ks" of the sample surface is calculated in the above manner, and when these data are displayed on the image display device 22, the hardness distribution of the surface of the sample 2 can be acquired.

Figure 6:
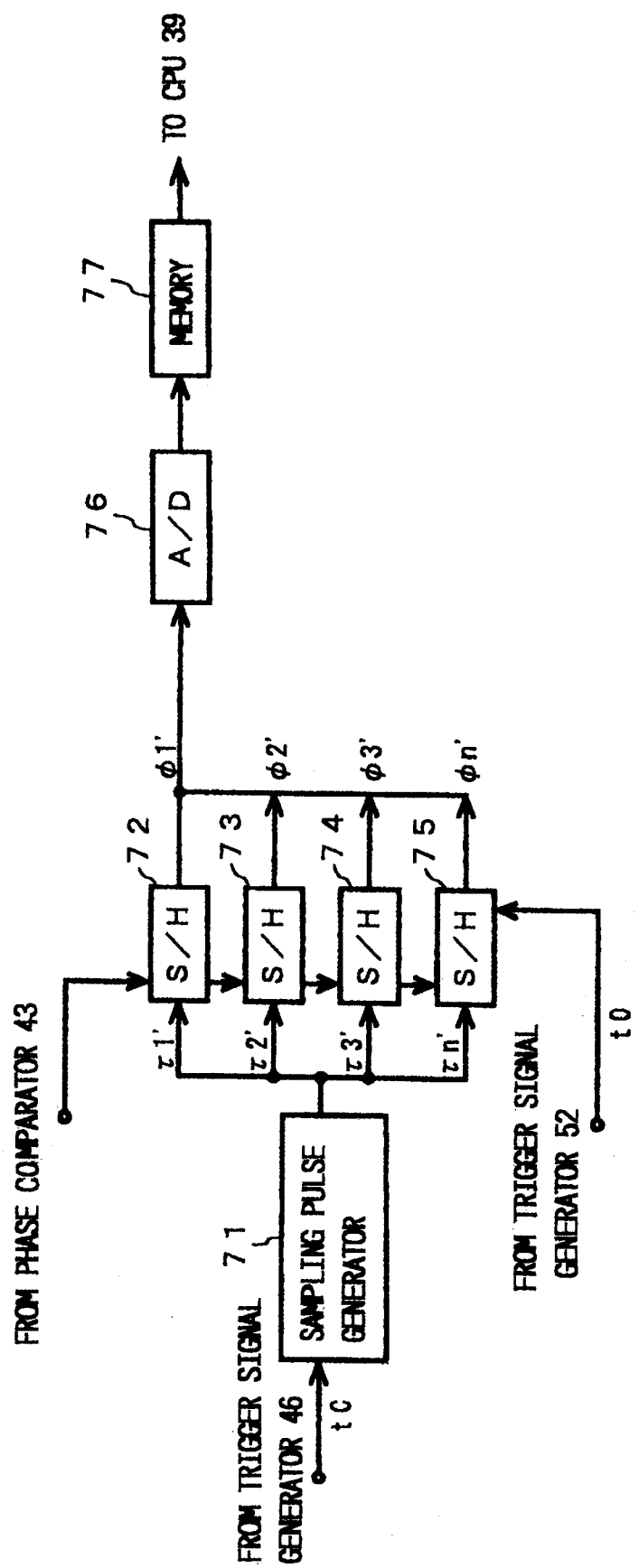
FIG. 6 is a block diagram for showing an example of a circuit for measuring a dynamic viscous/elastic characteristic.

Also, a dynamic viscous/elastic characteristic of the sample 2 can be acquired as follows. That is, the probe is made in contact with the sample surface, and while the cantilever 3 is fine-vibrated during a certain section (namely, from time instant ② to time instant ④ in FIG. 2C) in the sample, the phases of the vibrations of the cantilever and the phases of the oscillator 5 are measured in the time sequences τ1' to τn'. Then, phase differences φ1' to φn' measured to acquire this dynamic viscous/elastic characteristic of the sample 2. As readily a circuit for measuring this dynamic viscous/elastic characteristic, a circuit shown in FIG. 6 is merely added to the circuit indicated in FIG. 5. This measuring circuit may be arranged by a sampling pulse generator 71 for generating sampling pulses τ1', τ2', τ3' and τn'; sample/hold circuits 72 to 75 for sampling/holding the output signal from the phase comparator 43 at the respective timing of these sampling pulses τ1', τ2', τ3' and τn'; an A/D converter 76 for A/D-converting the phase differences φ1' to φn' corresponding to the outputs from these sample/hold circuits 72 to 75, namely for A/D-converting the viscous/elastic data; and further a memory 77. The data stored in this memory 77 are then supplied to the computer 39. In accordance with this circuit, it is possible to acquire viscous data φixiyi (τi') at a depth point hi' of a certain point (xi, yi) on the sample surface.

The above-described embodiment has be described based on such an apparatus that the sample 2 is mounted on the piezoelectric scanning apparatus 1, and this sample 2 is moved along the upper/lower directions. However, the present invention is not limited thereto, but may be modified. For example, the cantilever 3 is fixed on this piezoelectric scanning apparatus 1, and while the cantilever 3 may be scanned along the x/y directions, this cantilever 3 may be moved in the fine mode along the z direction.

As is readily apparent from the above-described explanations, according to the present invention, the probe is moved along the z direction at the first frequency with such an amplitude defined from the position where at least the sample is depressed by the probe up to the position where the probe does not receive the atom reacted force with respect to the sample surface, and the data are acquired while this probe is moved. As a consequence, there is such an effect that the distributions of the physical amounts (for example, magnetic field, electric field, atom reacted force, etc.) distributed from this sample surface along the depth direction can be monitored in the three-dimensional manner.

Also, there is another effect that plural sorts of data involved by one point of the sample can be simultaneously acquired while the probe is reciprocated in one turn along the z direction, namely while the data of 1 pixel are acquired. Furthermore, this operation is continued over the entire observation region of the sample, so that the natures of the entire sample can be checked in the multiple aspects. There are further effects that since these plural sorts of data are acquired within 1 scanning operation, these plural sorts of data own the mutual relationships, and also the probe microscope with high operability can be provided.

Also, there is a further effect that as the plural sorts of data, at least two sorts of data can be acquired. Concretely speaking, there are the depth-direction distribution of the physical amount (for instance, magnetic field, electric field, atom reacted force, electric double layer force in fluid, etc.) irradiated from the sample surface; the sample hardness information; the surface shape information of the sample; and the information (for instance, viscous degree and adsorption force of adsorption layer) related to the adsorption layer of the sample.

What is claimed is:

1. A method of operating a three-dimensional scanning probe microscope having a probe capable of relatively performing scanning operations along an x direction and a y direction parallel to a surface of a sample, and also a moving operation along a z direction perpendicular to the sample surface with respect to the sample surface comprising the steps: vibrating the probe along the z direction at a second frequency corresponding to a number of points on the sample surface at which data is to be acquired with an amplitude extending from a first position at which the sample is penetrated by the probe up to a second position where the probe is spaced in the z direction from the sample surface and is not influenced by inter-atomic forces between the probe and the sample surface; and acquiring data corresponding to a plurality of characteristics of the sample are during one cycle when the probe is moved from one of the first and second positions to the other of the first and second positions, and then back to the one of the first and second positions; whereby the data corresponding to the plurality of characteristics of the sample is acquired during a single pass scanning of a desired region of the sample surface.

2. A method of operating a three-dimensional scanning probe microscope as claimed in claim 1; wherein the probe is vibrated at a first frequency greater than the second frequency, the first frequency is the resonance frequency of the cantilever on which the probe is mounted, and the second frequency corresponds to the number of points on the sample surface at which data is to be acquired per unit time.

3. A method of operating a three-dimensional scanning probe microscope as claimed in claim 1; wherein waveforms of the probe vibration at the first frequency and the second frequency are selected from sine waves and cosine waves.

4. A method of operating a three-dimensional scanning probe microscope as claimed in claim 1; wherein the probe is feedback-controlled so that the quantity of penetration of the probe into the sample surface is maintained constant in the one cycle, and at least one of phase shift information of the probe vibration at the first frequency and change in amplitude or maximum amplitude information of the probe vibration at the second frequency is temporarily registered in a sample and hold circuit and stored in an external memory for each cycle of vibration of the probe at the second frequency.

5. A method of operating a three-dimensional scanning probe microscope as claimed in claim 1; wherein data for one point on the sample surface is acquired during each period of vibration of the probe at the second frequency.

6. A method of operating a three-dimensional scanning probe microscope as claimed in claim 5; wherein data corresponding to a plurality of characteristics of the sample is acquired during each period of vibration of the probe at the second frequency, the data acquired during each period is stored in a memory for each of a plurality of said periods, and the plurality of characteristics of the sample are selectively displayed on an image display device.

7. A method of operating a three-dimensional scanning probe microscope as claimed in claim 5; wherein data corresponding to more than two different characteristics of the sample is acquired for each point on the sample during one cycle of z direction vibration of the probe at the second frequency, including at least one characteristic related to a depth direction distribution of a physical amount irradiated from the sample surface selected from the group consisting of electromagnetic field, adsorption force, surface reacted force, electric double layer force in fluid and at least one characteristic selected from the group consisting of hardness of the sample, surface shape of the sample, viscous/elastic characteristics of the sample, and adsorption layer characteristics of the sample.

8. A method of operating a three-dimensional scanning probe microscope as claimed in claim 7; wherein the data corresponding to a depth direction distribution of the physical amount radiated from the sample surface is acquired based on motion of the probe and phase difference information between phases of vibration of the probe at the first and second frequencies, and is detected during movement of the probe from a position at which the probe is separated from the sample surface to another position where the probe is in contact with the sample surface.

9. A method of operating a three-dimensional scanning probe microscope as claimed in claim 7; wherein the data corresponding to hardness of the sample is acquired based on motion of the probe which is produced during movement of the probe from a position at which the probe is in contact with the sample surface to another position where the probe is penetrated into the sample.

10. A method of operating a three-dimensional scanning probe microscope as claimed in claim 7; wherein the data corresponding to a viscous/elastic characteristic of the sample is acquired based on motion of the probe which is detected while the probe is vibrated at the second frequency and the probe is penetrated into the sample surface at a certain depth of the sample, and also based on phase difference information between phases of vibration of the probe at the first and second frequencies.

11. A method of operating a three-dimensional scanning probe microscope as claimed in claim 7; wherein the data corresponding to the adsorption layer characteristics of the sample is acquired based on motion of the probe during one period of vibration of the probe at the second frequency from a position at which the probe is in contact with the sample surface to another position at which the probe is separated from the sample surface and then moved to a position distant from the sample.

12. A scanning probe microscope comprising: a probe having a sharpened tip; a sample support for supporting a sample in proximity to the probe; relative movement means for causing relative movement between the probe and the sample in a first plane so that the probe scans across the sample surface and for causing relative movement between the probe and the sample in a second plane substantially perpendicular to the first plane; data acquisition means for monitoring the probe as it undergoes relative movement with respect to the sample to acquire data corresponding to sample characteristics; and image display means for displaying an image of a characteristic of the sample based on information output by the data acquisition means; wherein the relative movement means causes the probe to undergo a cycle of movement in the second plane at a plurality of points across the sample surface during scanning movement of the probe relative to the sample in the first plane, the cycle of movement comprising movement of the probe in the second plane between one of a first position at which the sample is penetrated by the probe and a second position where the probe is spaced from the sample and is not influenced by inter-atomic forces between the probe and the sample surface, so that data corresponding to a plurality of characteristics of the sample may acquired at each point on the sample surface where each cycle of movement in the second plane is conducted.

13. A scanning probe microscope according to claim 12; wherein the relative movement means causes the probe to vibrate in a sinusoidal manner at a first frequency, each period of the sinusoidal movement comprising one cycle of movement of the probe in the second plane.

14. A scanning probe microscope according to claim 13; further comprising an oscillator for vibrating the probe at a second frequency greater than the first frequency, and wherein the data acquisition means includes means for monitoring for deviations in vibration of the probe at least at one of the first and second frequencies to determine physical characteristics of the sample.

15. A scanning probe microscope according to claim 14; wherein vibration of the probe at the second frequency is sinusoidal.

16. A scanning probe microscope according to claim 12; further comprising a feedback circuit for controlling probe movement between the first position and the second position so that the probe achieves a constant amount of penetration by the probe into the sample.

17. A scanning probe microscope according to claim 12; further comprising a cantilever on which the probe is mounted, so that before the probe penetrates the sample surface the cantilever bends and after the probe is removed from the sample surface adsorption of the probe by the sample surface causes the cantilever to bend and sample hardness and adsorption characteristics of the sample may be determined based on the bending of the cantilever.

* * * * *